United States Patent [19]

Sharp et al.

[11] 4,248,717

[45] Feb. 3, 1981

[54] METHOD FOR REMOVING ELEMENTAL SULFUR FROM HIGH TEMPERATURE, HIGH PRESSURE WELLS AND FLOW LINES

[75] Inventors: Shelby P. Sharp, Tulsa, Okla.; Lyman Yarborough, Naperville, Ill.

[73] Assignee: Standard Oil Company (Indiana), Chicago, Ill.

[21] Appl. No.: 43,520

[22] Filed: May 29, 1979

[51] Int. Cl.$^3$ .............................................. E21B 43/00
[52] U.S. Cl. ............................. 252/8.55 B; 166/312; 299/4; 299/5
[58] Field of Search ........................... 252/8.55 B, 364; 166/312; 299/4, 5

[56] References Cited

U.S. PATENT DOCUMENTS

| | | | |
|---|---|---|---|
| 3,331,657 | 7/1967 | Peter et al. | 423/242 |
| 3,393,733 | 7/1968 | Kuo et al. | 166/267 |
| 3,531,160 | 9/1970 | Fisher | 299/5 |
| 3,545,916 | 12/1970 | Deicher et al. | 423/228 |
| 3,744,565 | 7/1973 | Brown | 166/267 |
| 3,846,311 | 11/1974 | Sharp et al. | 252/8.55 B |
| 3,909,422 | 9/1975 | Sample | 252/8.55 B |
| 3,913,678 | 10/1975 | Blount et al. | 166/310 |

OTHER PUBLICATIONS

Brown et al., article in *The Oil and Gas Journal*, vol. 57, No. 4, Oct. 26, 1959, pp. 73–78.

*Primary Examiner*—Herbert B. Guynn
*Attorney, Agent, or Firm*—Robert B. Stevenson

[57] ABSTRACT

A relatively nonvolatile, high molecular weight sulfur solvent produced by adding at least 40 parts by weight of elemental sulfur per 100 parts by weight dialkyl disulfide to an amine activated dialkyl disulfide oil. Such a sulfur solvent is particularly useful in sustaining a liquid phase at bottomhole conditions for high temperature, high pressure wells.

3 Claims, 4 Drawing Figures

METHOD FOR REMOVING ELEMENTAL SULFUR FROM HIGH TEMPERATURE, HIGH PRESSURE WELLS AND FLOW LINES

BACKGROUND OF THE INVENTION

1. Field of the Invention

The present invention relates to an improved sulfur solvent system for use in high temperature, high pressure wells. More specifically, it is concerned with an amine activated alkyl polysulfide oil capable of sustaining a liquid sulfur dissolving phase at high temperature, high pressure bottomhole conditions.

2. Description of the Prior Art

The problems associated with sulfur depositing and accumulating in sour gas distillate wells which result in plugging the formation, tubing string, and surface equipment and reducing the desired flow of fluids therefrom, are well known. Whenever a natural formation contains high concentrations of hydrogen sulfide and elemental sulfur, safeguards to inhibit the precipitation of elemental sulfur and methods to remove sulfur blockage during production are employed. The prior art proposes various methods for using various types of sulfur solvents, for example, aromatic hydrocarbons such as benzene, toluene, xylene, and naptha, and the classical sulfur solvent carbon disulfide. Thus, U.S. Pat. No. 3,744,565 teaches the use of a saturated and unsaturated cyclohydrocarbon while U.S. Pat. No. 3,393,733 exemplifies the use of carbon disulfide.

During the past decade, various methods based on the ability of elemental sulfur to form polysulfides and thus be removed in the polysulfide form have been suggested and have experienced limited commercial success. In U.S. Pat. No. 3,331,657 an aqueous alkali metal or ammonium hydroxide caustic solution is employed to react, in situ, with hydrogen sulfide forming the corresponding alkali sulfide which then prevents or removes elemental sulfur by forming the polysulfide. U.S. Pat. No. 3,909,422 suggests a further improvement in the inorganic caustic reaction by employing a wetting agent in combination with the alkali hydroxide. Similarly, U.S. Pat. No. 3,545,916 proposes the use of a basic aqueous solution containing high concentrations of either an alkyl amine (e.g., ethyl amine, etc.) or aromatic nitrogen containing heteronuclear cyclic compound (e.g., pyridine, etc.) to prevent the precipitation of sulfur by virtue of the formation of polysulfides. In U.S. Pat. No. 3,913,678, the polysulfide forming property of ethyl amine is again employed in combination with a complexing agent such as EDTA to inhibit scale formation and sulfur deposits during sour gas well production. While in U.S. Pat. No. 3,531,160, elemental sulfur deposits in sour gas-sulfur wells is removed by circulating a liquid alkyl sulfide, alkyl disulfide, or alkyl polysulfide in the well.

U.S. Pat. No. 3,846,311, which involves a common coinventor relative to the present invention, is of particular interest to the present invention in that it represents the starting point from which the present invention developed. In this commonly assigned patent, a method for increasing the amount of sulfur which a given quantity of dialkyl disulfide solvent will dissolve is disclosed. The method requires that the dialkyl disulfide be catalyzed by the addition of a small amount of a lower aliphatic amine followed by an aging process. Such a solvent, produced in accordance with this reference, will exhibit an outstanding ability to dissolve sulfur with ultimate sulfur solubilities of as high as five times as much sulfur being dissolved on a weight basis as there was weight of original dialkyl disulfide. Such compositions have now been employed commercially to replace the more dangerous carbon disulfide sulfur solvents. However, the commercial success has been somewhat limited in that certain high temperature, high pressure ultra deep sour gas wells have been encountered wherein the amine activated dialkyl disulfide solvents have been ineffective, thus necessitating a resumption of the use of carbon disulfide solvent. It is presently felt that the failure of the amine activated dialkyl disulfide solvents in the high temperature, high pressure wells can be directly attributed to the fact that these previous sulfur solvents do not create sufficient liquid phase at bottomhole conditions to be effective in removing the sulfur deposits.

With ever increasing world energy demands and the advent of international fuel shortages, the oil and gas industry has been forced to drill deeper and deeper into more hostile environments in search of critically needed fuel. As a result, high temperature, high pressure deep horizon sour gas fields, potentially involving gas wells of interest in the present invention, have been discovered throughout the world. For example, high pressure deep sour gas wells have been encountered in Canada, France, West Germany, and Austria, as well as in Mississippi, Texas, and Oklahoma. As a general rule of thumb, at bottomhole temperatures in excess of 250° F. and bottomhole pressures of the order of 4000 psi, one can anticipate sulfur deposit removal problems during production. Such conditions are now being frequently exceeded, particularly when the depth of the well approaches 20,000 ft.

SUMMARY OF THE INVENTION

In view of the problems associated with the use of an amine activated dialkyl disulfide sulfur solvent to remove sulfur deposits in certain high temperature, high pressure sour gas wells, because of the inability of these solvents to exist in a liquid phase at bottomhole conditions, we have developed a method of dissolving such sulfur deposits involving the steps of:

(a) preparing a relatively nonvolatile, high molecular weight amine activated dialkyl polysulfide sulfur solvent capable of existing in a liquid phase at the bottomhole conditions consisting of a dialkyl disulfide to which has been added up to about 27 parts by weight of an alkyl amine per 100 parts by weight dialkyl disulfide and at least 40 parts by weight of elemental sulfur per 100 parts by weight dialkyl disulfide, and (b) injecting said relatively nonvolatile, high molecular weight amine activated dialkyl disulfide sulfur solvent prepared in step (a) into said sour gas well to dissolve and thus remove the sulfur deposit.

In one aspect of the invention, the improved sulfur solvent is injected into the bottomhole formation and the well is closed in stopping production to allow the solvent to soak and remove the sulfur deposits. In another aspect of the invention a small but effective amount of sulfur solvent is continuously injected into the downhole formation or production string while producing such as to remove sulfur deposits and inhibit or prevent formation of additional sulfur deposits. Still, in a third aspect of the invention, the presence of sulfur deposits is monitored and continuous injection is alternated with the soaking technique as needed for the particular well. In all aspects of the present invention, a liquid phase sulfur solvent is achieved at bottomhole conditions by virtue of incorporating large quantities of elemental sulfur into the amine activated dialkyl disulfide prior to injecting it into the sour gas well.

Thus, the primary objective of the present invention is to provide an amine activated dialkyl disulfide sulfur solvent wherein the volatility of the solvent can be tailored according to the need of the particular sour gas well to be treated such that upon injection of small volumes of the solvent, a liquid sulfur dissolving phase will exist at the hostile bottomhole conditions of the well. An additional objective is the utilization of such a sulfur dissolving liquid phase in a high temperature, high pressure sour gas wells to remove and prevent elemental sulfur deposits which tend to reduce rates of production. Additional objectives should be obvious to one of ordinary skill in treating sulfur plug formations and production equipment upon complete reading of the specification and associated claims.

DESCRIPTION OF THE PREFERRED EMBODIMENTS

Figure 1:
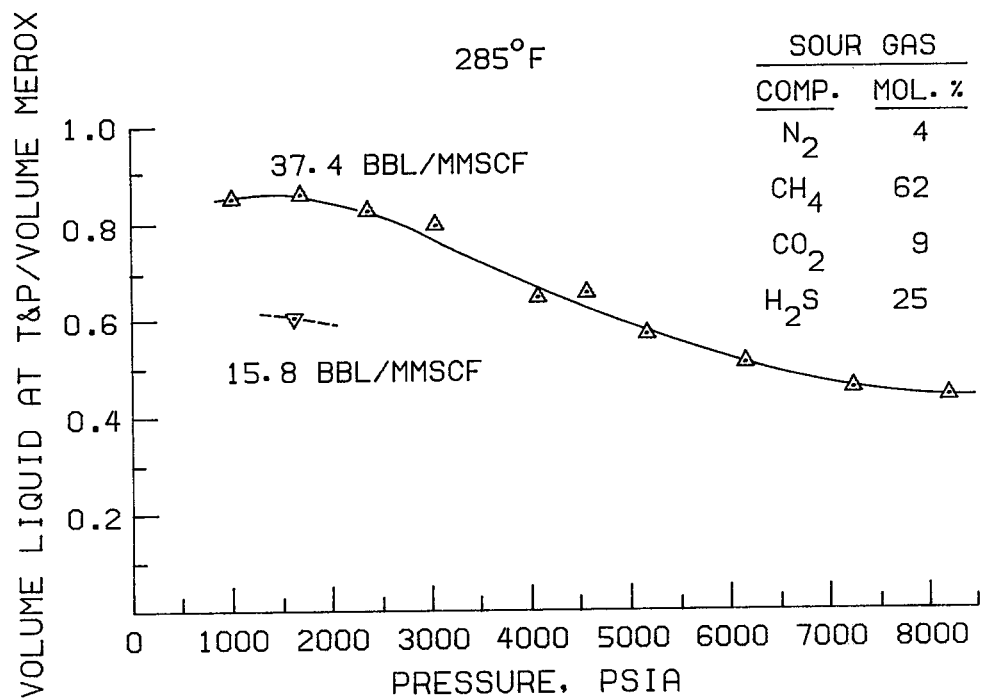
FIG. 1 of the drawing illustrates the volume factor as a function of pressure for fresh activated Merox ® preloaded with 80 grams of sulfur per 100 grams of Merox.

We have discovered that when an alkyl amine is used to activate a dialkyl disulfide sulfur solvent and sufficient sulfur is then incorporated into the solvent, a heavy alkyl polysulfide oil results which is capable of existing in the liquid phase at bottomhole conditions characteristic of the sour gas wells of interest. This heavy oil is found to be an effective sulfur solvent when employed in sour gas wells of interest. It is believed that both the alkyl amine and the dissolved sulfur are chemically bound to the dialkyl disulfide thus creating the desired high molecular weight and associated low volatility. Consequently, a liquid phase is observed at high temperature and high pressure in the presence of high gas flow rate even though relatively small quantities of the solvent are being employed. By selecting the amount of dissolved sulfur, the degree of volatility can be controlled and the composition can be tailored to the needs of the particular gas well, thus insuring the presence of a liquid phase at bottomhole conditions.

Preparation of the sulfur solvent according to the present invention can be accomplished in a variety of manners provided three key features are present. First, the major constituent is selected from a class of compounds or mixtures of compounds which for purposes of this invention we have chosen to refer to as dialkyl disulfides. Second, at least one part by weight of an aliphatic amine is added per 100 parts by weight dialkyl disulfide in order to enhance the sulfur solvency of the dialkyl disulfide. Third, at least 40 parts by weight and preferably 80 parts by weight sulfur is dissolved into the amine activated dialkyl disulfide in order to produce a composition which will exist in a liquid phase at the conditions at which the undesired elemental sulfur deposit is to be removed.

The dialkyl disulfides useful as starting materials in preparing the improved sulfur solvent of the present invention can be viewed as involving a pair of alkyl radicals (R and R') bonded to a disulfide unit as represented in the formula R—S—S—R'. Such compounds are also referred to in the chemical literature as alkyl disulfides, thus the terms should be considered equivalent for purposes of this invention. The individual dialkyl disulfide includes such compounds as dimethyl disulfide, diethyl disulfide, dioctyl disulfide, ditertiary tetradecyl disulfide, and the like. One particularly useful starting material is a mixture of aliphatic disulfides in which the aliphatic group therein contains from about 2 to 11 carbon atoms; e.g., $(C_2H_5S)_2$, $(C_{11}H_{23}S)_2$, etc., typically those disulfide mixtures produced as a product stream of the Merox process described in the *Oil and Gas Journal*, vol. 57, pp. 73-78, Oct. 26, 1959. Such mixtures of disulfides are produced by first contacting a refinery hydrocarbon stream containing aliphatic mercaptans with a caustic solution to produce corresponding sodium salts of the mercaptans. The latter are then converted to dialkyl disulfides by air oxidation, simultaneously regenerating the caustic.

The addition of the aliphatic amine in order to enhance the sulfur solvency properties of the dialkyl disulfide can be accomplished by any of the well known methods found in the art, including the method described in U.S. Pat. No. 3,846,311, except the necessity of the aging step is viewed as being optional. Also, as indicated in the U.S. Pat. No. 3,846,311, the aliphatic unsubstituted amines are believed to be uniquely suitable for activating the dialkyl disulfide. The normally liquid lower aliphatic amines of about 4 to 12 carbon atoms were found to be preferred when employed at a concentration of up to about 10 weight percent based on the weight of the dialkyl disulfide. Although the normally liquid lower aliphatic amines are the most convenient to handle, we have now found that higher molecular weight, easily melted, fatty amines and in particular, a group of N-alkyl-1, 3-propane diamines are functionally equivalent and can be used to produce the desired amine activated dialkyl disulfide. It is also believed that the normally gaseous alkyl amines are functionally equivalent provided they are maintained in contact with the dialkyl disulfide for a sufficient time to be chemically incorporated into the dialkyl disulfide according to what now appears to be a specific chemical reaction common to all aliphatic amines and dialkyl disulfides. By monitoring the vapor pressure of a relatively volatile aliphatic amine during the amine activation of the dialkyl disulfide (e.g., diethyl amine) and by repeating this measurement at incrementally increasing quantities of amine, it has been observed that an apparent 2 mols of dialkyl disulfide per 1 mol of nitrogen amine is the upper stoichiometric quantity of amine being chemically incorporated into the amine activated dialkyl disulfide sulfur solvent. Under previous conditions, when using the lowest molecular weight aliphatic amines, this upper stoichiometric ratio roughly corresponds to 10% by weight amine as acknowledged in the previous patent literature. It has now been found that achieving full stoichiometric incorporation of amine nitrogen is preferred and consequently, values in excess of 10 parts by weight amine per 100 parts by weight dialkyl disulfide are useful with values frequently being as high as 20 to about 27 parts by weight amine. Preferably, the amount of amine will exceed 5 parts per weight amine per 100 parts per weight dialkyl disulfide. Examples of particularly useful amines include diethyl amine, triethyl amine, diisopropyl amine, 2-ethyl hexyl amine, butyl amine, hexyl amine, octyl amine, dodecyl amine, and the previously mentioned N-alkyl-1, 3-propane diamines ($RNH_2CH_2CH_2CH_2NH_2$ sold under the trade name Duomeen ® by the Armak Company of Chicago, Illinois).

Having activated the dialkyl disulfide by the addition of an amine, the desired alkyl polysulfide oil is then prepared by dissolving elemental sulfur in the amine activated disulfide oil. The solubility and the rate of dissolution of the sulfur in the dialkyl disulfide/amine mixtures vary somewhat with the source of the sulfur, the particular physical state and the degree of pulverization. However, any elemental free sulfur is acceptable for purposes of this invention. The dissolution process can be performed by conventional techniques with mild heating and agitation being advantageously employed. The specific amount of sulfur to be dissolved will vary according to the needs of the particular gas well to be treated. In principal, the more severe the bottomhole conditions, the greater the sulfur content. It has been our experience that significant liquid phase at bottomhole conditions can be achieved with as little as 40 to 60 parts by weight sulfur per 100 parts by weight dialkyl disulfide with 80 parts by weight sulfur per 100 parts by weight dialkyl disulfide being particularly useful in that the resulting solution is easily handled, stored, and transported at ambient conditions without appreciable sulfur precipitation or excessive viscosities and solidification. Although the higher sulfur concentrations are preferred with respect to the creation of the necessary quantity of liquid sulfur dissolving phase, in situations involving cold environments or during cold periods of the year the intentional injection of a 40 parts by weight sulfur solution may be necessary. In such cases the fact that the liquid phase created is a sulfur solvent and we are injecting this solvent into a sour gas well, the inherent process of dissolving sulfur will bring the composition back into the preferred range. Furthermore, high concentrations of sulfur are compatible with the present invention and may be necessary in extremely hostile downhole conditions. In such cases, any solidification or handling problems can be alleviated by working at higher temperatures. Literature references document cases wherein over 500 grams of sulfur per 100 grams of dialkyl disulfide have been achieved. However, in practicing the present invention one must remember that this reference is describing ultimate sulfur solubility. Therefore, in preparing the present compositions one must stop short of ultimate sulfur saturation in order to produce what could categorically be described as a sulfur solvent.

It is felt that the presence of the liquid alkyl polysulfide phase in the presence of high flow rate sour dry gas at high temperatures and high pressures is critical to the successful dissolving of elemental sulfur. In order to confirm the presence of the desired liquid phase at bottomhole conditions, a series of phase distribution tests in a variable volume windowed PVT cell were performed. Table I presents the data related to the preparation of the various alkyl polysulfide oils used during such tests.

TABLE I

| | Preparation of Alkyl Polysulfide Oil | | | | | |
|---|---|---|---|---|---|---|
| Sample | Weight of Fresh Disulfide Oil gms | Weight of Diethylamine, gms | Weight of Age Activated Disulfide oil, gms | Weight of Pulverized Sulfur, gms | Maximum Temperature Mixture Heated To Dissolve Sulfur With Occasional Shaking, °F. | Quantity of Sulfur Residue Present When Mixture Cooled To Room Temperature (74° F.), gms | Pour Point of Mixture After Cooling To Room Temperature, °F. |
| 1 | 100 | 7.1 | — | 80 | 190 | 0 | <10 |
| 2 | 100 | 7.1 | — | 90 | 200 | 1 | <10 |
| 3 | — | — | 100 | 90 | 200 | 0 | <10 |
| 4 | — | — | 100 | 100 | 190 | 0 | — |
| 5 | — | — | 100 | 110 | 200 | 0 | <10 |

In preparing the five samples, the first two were made by adding 7.1 grams of diethylamine to 100 grams of Merox disulfide oil. The pulverized sulfur was then added to this fresh, activated Merox solution without any appreciable aging. The other three were prepared by starting with aliquotes of a Merox/diethylamine mixture which had already been aged according to the procedure in U.S. Pat. No. 3,846,311. To these aged samples were added pulverized elemental sulfur. In all cases, the sulfur dissolution is performed by heating and occasional shaking. Upon cooling to room temperature, only Sample No. 2 showed a slight tendency for sulfur precipitation. Thus, the solution should be compatible with conventional bulk handling procedures at most ambient temperatures as previously mentioned. In regards to this property, the data also indicate that the aged samples relative to the fresh samples were capable of incorporating higher concentrations of sulfur without showing any tendency to precipitate at room temperature. Of the samples tested, all showed pour points below 10° F. At extreme conditions and at higher sulfur concentrations, temperature control by way of steam jacketing, external or internal heating, insulation and the like may be necessary during preparation and handling. Thus for convenience about 80 grams of sulfur per 100 grams of disulfide is viewed as being preferable, but higher concentrations may be necessary, particularly in ultra high temperature and pressure sour gas wells.

The first and the last samples as presented in Table I were selected for testing in the presence of a sour dry gas in a high pressure variable volume PVT windowed cell at 285° F. (141° C.). In performing the phase distribution tests, the sour gas composition and temperature were chosen to match the reported operating conditions of a known gas reservoir wherein sulfur precipitation is a problem. The particular sour gas well of interest was reported to be producing about 1 MMSCF of gas per hour and depositing about 250 lbs (114 Kgm) of elemental sulfur downhole per hour.

The first amine activated alkyl polysulfide oil tested was prepared by first adding 7.1 grams of diethylamine to 100 grams of fresh Merox disulfide oil. Then 80 grams of pulverized sulfur was dissolved into this dialkyl disulfide oil under mild heating of up to 190° F. (88° C.) with gentle stirring. For purposes of this invention, we shall refer to this type of sample as an "unaged" or "fresh" solvent. After cooling the fresh solvent back to room temperature of about 75° F. (24° C.), a 10 cc aliquot of the solvent was placed in the variable volume windowed cell and 2 gm mols (47 grams) of a sour dry gas having a composition as shown in Table II was injected at 1500 psi into the same cell.

TABLE II

| Component | Mol % |
|---|---|
| $N_2$ | 4 |
| $CH_4$ | 62 |
| $CO_2$ | 9 |
| $H_2S$ | 25 |

This particular composition corresponds to 37.4 barrels of alkyl polysulfide oil being injected into the sour gas well per million standard cubic feet of sour gas being produced from the well (Bbl/MMSCF). The cell was held at 285° F. (141° C.) while the volume was varied such that the pressure in the cell ranged from approximately 1,000 to 8,200 psia. The total volume of the cell and the volume of the liquid phase present in the cell were recorded at various pressures and are presented in Table III and FIG. 1.

TABLE III

Phase Distribution Test Results for Fresh Amine Activated Alkyl Polysulfide Oil with Sour Gas at 285° F.

| Pressure, psia | Total Volume, cc | Liquid Volume, cc | Volume Liquid at Temperature and Pressure per Volume Polysulfide Oil |
|---|---|---|---|
| 37.4 Bbl Oil/MMSCF Sour Gas | | | |
| 1,016 | 931.34 | 8.4 | 0.84 |
| 1,702 | 539.41 | 8.5 | 0.85 |
| 2,359 | 384.12 | 8.15 | 0.815 |
| 3,050 | 296.68 | 7.8 | 0.78 |
| 4,063 | 228.04 | 6.5 | 0.65 |
| 4,567 | 207.20 | 6.4 | 0.64 |
| 5,190 | 188.07 | 5.6 | 0.56 |
| 6,175 | 167.40 | 5.0 | 0.50 |
| 7,238 | 152.60 | 4.5 | 0.45 |
| 8,202 | 23.10 | 4.35 | 0.435 |
| 15.8 Bbl Oil/MMSCF Sour Gas | | | |
| 1,662 | 1,321.64 | 6.0 | 0.60 |

As indicated in the third column of Table III, a liquid phase was present throughout the entire pressure range. The fourth column represents the ratio of volume of liquid at the specified temperature and pressure per volume of polysulfide oil injected. Such data is of practical importance for designing a commercial well treatment in that it reflects the relative volume of liquid phase remaining at various pressures (depths) in the well when 37.4 barrels of oil are injected per MMSCF of sour gas produced; e.g., at 8,000 psia approximately 44% of the volume injected is the volume of the liquid state at well conditions. At the end of the phase distribution measurements, the cell was returned to the lower end of the pressure range and an additional 2.7 gm mols (63.5 grams) of sour gas was injected such as to produce a composition ratio of 15.8 Bbl/MMSCF. After taking one data point, a seal in the windowed cell failed, aborting the test. This additional data point is included in Table III and FIG. 1. Although there is only one measurement at the 15.8 Bbl/MMSCF composition ratio, it does establish that significant liquid phase exists (at least at one pressure) and quantitatively implies that reducing the quantity of liquid injected by a factor of over ½ still produces a significant amount of the desired liquid phase at downhole conditions.

A second phase distribution test was performed using an aged amine activated dialkyl disulfide oil prepared according to the procedure found in U.S. Pat. No. 3,846,311. To a 100 gram sample of the aged diethylamine activated dialkyl disulfide oil (Merox mixture) was added 110 grams of pulverized sulfur (See Sample 5, Table I). The mixture was heated to about 200° F. (93.3° C.) with occasional stirring until the sulfur dissolved. After cooling back to room temperature, 75° F. (24° C.), a 1.90 cc aliquot was placed in the variable volume windowed cell along with 4.55 gm mols of sour gas injected at 1,110 psia (a ratio of 3.14 Bbl/MMSCF). This particular ratio corresponds to the solvent injection capabilities of the equipment available at the sour gas well of interest. Again, the volume of the cell was varied such that the pressure ranged from about 1,800 psia to over 7,000 psia. Data related to the total volume and the volume of liquid at various pressures are presented in Table IV. Again, significant liquid phase was observed across the entire pressure range. After completing the phase distribution measurements, the windowed cell was returned to the lower portion of the pressure range and additional aged diethylamine activated dialkyl polysulfide oil (1.90 cc at 75° F. and 1900 psi) was injected into the cell, thus simulating a ratio of 6.28 Bbl/MMSCF. The phase distribution measurements were repeated at this higher alkyl polysulfide oil concentration, and the respective data are presented in Table IV and FIG. 2. At the completion of these measurements, the PVT windowed cell was cooled to 113° F. (45° C.) and two additional data points were measured. These two latter data points are descriptive of the anticipated conditions typical of a separator located downstream of the wellhead of the sour gas well being modeled. These data are also presented in Table IV and FIG. 2.

TABLE IV

Phase Distribution Test Results for Aged Activated Alkyl Polysulfide Oil With Sour Gas

| Pressure, psia | Total Volume, cc | Liquid Volume, cc | Volume Liquid at Temperature and Pressure per Volume Polysulfide Oil |
|---|---|---|---|
| 3.14 Bbl Oil/MMSCF Sour Gas at 285° F. | | | |
| 1,845 | 1,127.64 | 0.8 | 0.421 |
| 3,050 | 679.40 | 0.73 | 0.384 |
| 4,120 | 577.07 | 0.65 | 0.342 |
| 5,144 | 432.05 | 0.65 | 0.342 |
| 6,176 | 379.28 | 0.7 | 0.368 |
| 7,244 | 342.86 | 0.7 | 0.368 |
| 6.28 Bbl Oil/MMSCF Sour Gas at 285° F. | | | |
| 1,859 | 1,129.72 | 1.9 | 0.500 |
| 3,073 | 679.19 | 1.75 | 0.461 |
| 4,063 | 524.15 | 1.7 | 0.447 |
| 5,057 | 439.13 | 1.55 | 0.408 |
| 6,093 | 384.74 | 1.4 | 0.368 |
| 7,024 | 372.87 | 1.4 | 0.368 |

TABLE IV-continued

Phase Distribution Test Results for Aged Activated Alkyl Polysulfide Oil With Sour Gas

| Pressure, psia | Total Volume, cc | Liquid Volume, cc | Volume Liquid at Temperature and Pressure per Volume Polysulfide Oil |
|---|---|---|---|
| 113° F. | | | |
| 1,112 | 1,313.66 | 3.3 | 0.868 |
| 1,643 | 821.5 | 3.1 | 0.816 |

Figure 2:
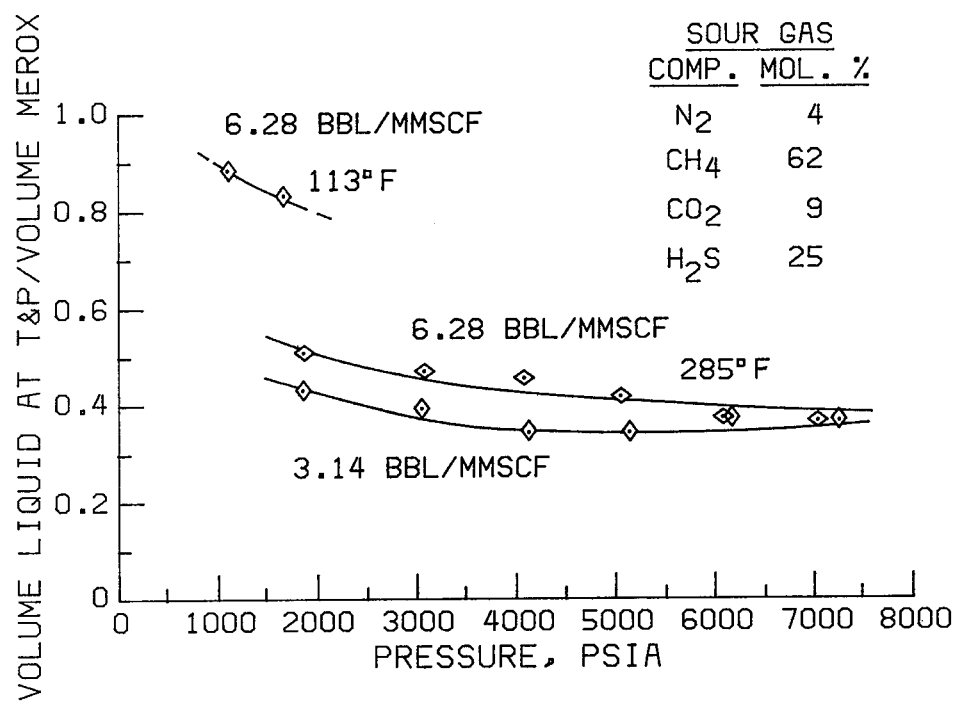
FIG. 2 of the drawing illustrates the volume factor as a function of pressure for aged activated Merox preloaded with 110 grams of sulfur per 100 grams of Merox.
Figure 3:
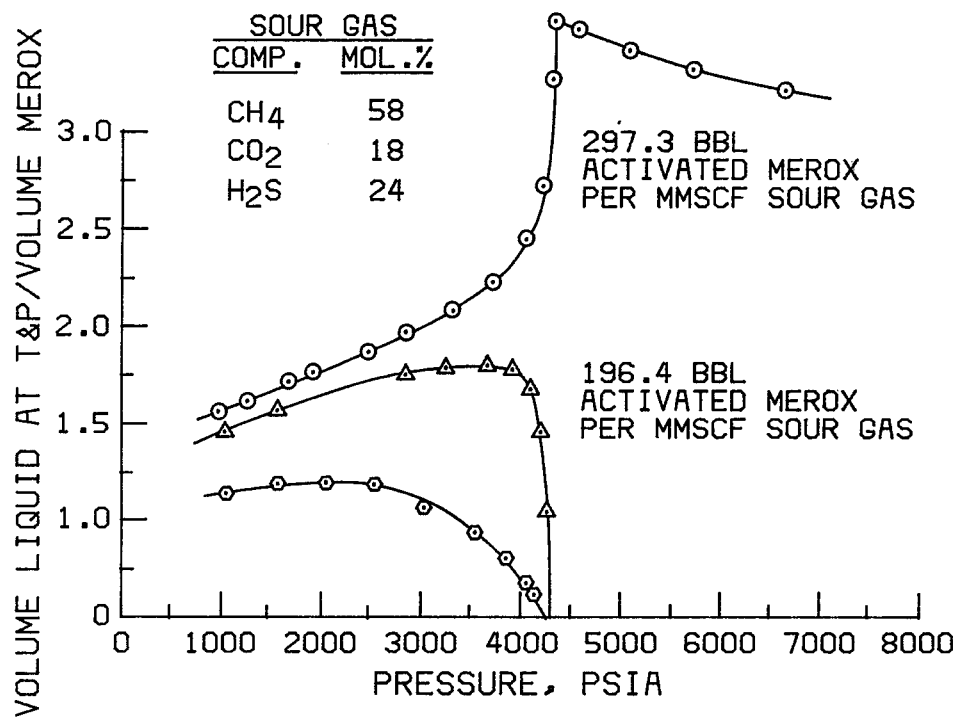
FIG. 3 of the drawing illustrates the volume factor as a function of pressure for Merox without preloaded sulfur.

In order to make the above phase distribution data of the alkyl polysulfide oils more meaningful and to place them in proper perspective relative to the prior art compositions, FIG. 3 presents phase distribution data of an amine activated Merox disulfide oil without the elemental sulfur. The format used in FIG. 3 is analogous to the previous FIG. 1 and FIG. 2, but certain distinctions were present. The test results shown in FIG. 3 were intended to simulate a sour gas well having a sour gas composition characteristic of Table V rather than Table II.

TABLE V

| Sour Gas | |
|---|---|
| Component | Mol % |
| $CH_4$ | 58 |
| $CO_2$ | 18 |
| $H_2S$ | 24 |

Tests were performed in a manner as previously described in a windowed variable volume cell. But in this case, the well of interest had a bottomhole temperature of 300° F. (149° C.). This well also had a history of problems associated with sulfur deposition. Phase distribution data was collected at three different compositions corresponding to 297.3 barrels of activated Merox per MMSCF of sour gas, 196.4 Bbl/MMSCF and 75.6 Bbl/MMSCF. Two different sources of Merox disulfide oil were employed. The 297.3 Bbl/MMSCF test and the 75.6 Bbl/MMSCF used a Merox produced at Gulf Oil's Turner Valley Plant while the 196.4 Bbl/MMSCF Test used a Merox disulfide mixture produced at Warren Petroleum's Baytown Plant. Table VI presents what is felt to be a typical compositional distribution of a Merox disulfide oil mixture.

TABLE VI

| Merox Disulfide Oil Composition | | |
|---|---|---|
| Component | Weight % | Mol % |
| Diethyldisulfide | 9.0 | 13.44 |
| Dipropyldisulfide | 13.3 | 16.15 |
| Dibutyldisulfide | 32.5 | 33.26 |
| Dipentyldisulfide | 33.9 | 29.97 |
| Dihexyldisulfide | 8.5 | 6.62 |
| Diheptyldisulfide | 0.85 | 0.56 |

In comparing the data presented in FIG. 3 to that shown in FIG. 1 and FIG. 2, the slight difference in temperatures, sour gas compositions and source of Merox dialkyl disulfide oil are felt to be of no major significance. The presence of the sulfur preloaded into the dialkyl disulfide oil is felt to be the cause of the drastic change in phase behavior. First looking at FIG. 3, it can readily be appreciated that at pressures in excess of approximately 4,250 psia, the presence of the liquid phase will not exist unless about 300 barrels of Merox are pumped into the well per MMSCF of gas being produced. In the absence of the liquid phase, the prevention and removal of sulfur deposits cannot be accomplished. Thus the prior art dialkyl disulfide oils, in general, will not serve as sulfur solvents in the deep hot, high pressure sour gas wells of particular interest in the present invention unless an excess of 300 barrels of solvent are injected per MMSCF of gas being produced. For all practical purposes, the injection of 300 barrels per MMSCF is impractical if not impossible.

In contrast, FIG. 1 and FIG. 2 clearly indicate the presence of liquid phase across the entire pressure range. Furthermore, the data indicate that the amount of liquid phase present at high temperature and high pressures characteristic of downhole conditions is greatly increased by the presence of the sulfur; i.e., significant liquid phase is present in FIG. 1 and FIG. 2 at much lower injected liquid to produced gas ratios than observed in FIG. 3. In view of the data, one must conclude that the addition to sulfur to the disulfide oil greatly reduced the volatility of the oil, thus resulting in the desired liquid phase even at high temperatures and high pressures.

In preparing the alkyl polysulfide oil of the present invention, the amount of sulfur preloaded into the amine activated disulfide oil should be sufficient to lower the volatility of the oil such as to guarantee the presence of a liquid phase at temperatures and pressures characteristic of a particular well. Since the present invention has its greatest utility in deep hot sour gas wells where a liquid condensate is not present, we have found that approximately 40 to 60 grams of dissolved sulfur per 100 grams of disulfide oil is sufficient in most cases. As previously indicated, 80 grams of sulfur per 100 grams of disulfide is particularly useful in that virtually no sulfur precipitation occurs at this concentration and average ambient temperatures leading to solutions that are easily transported and stored. However, concentrations in excess of this are useful, particularly at higher temperatures and pressures where even lower volatilities are necessary.

Figure 4:
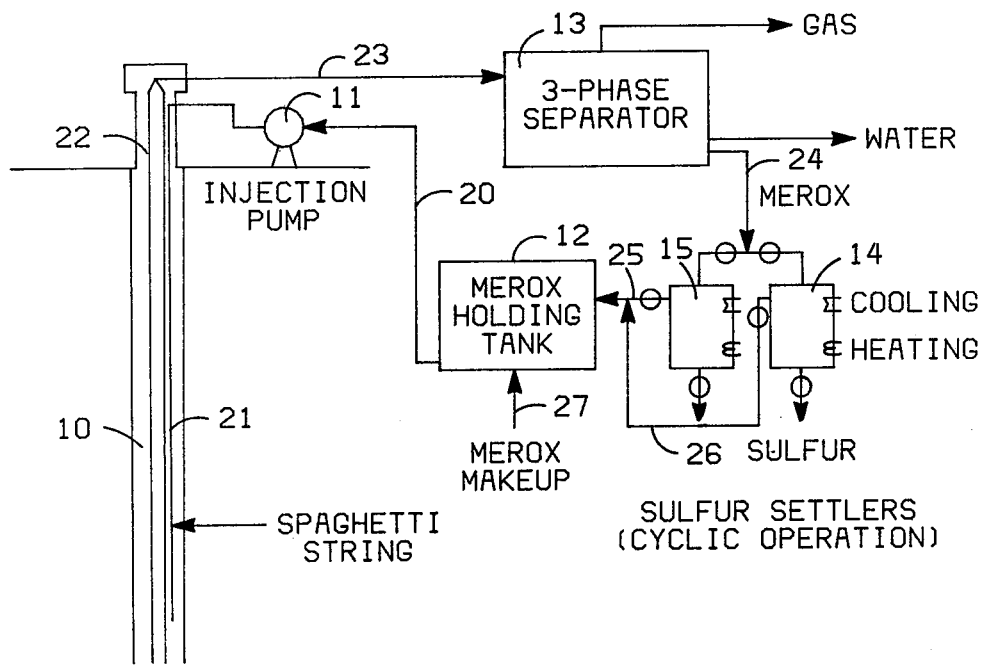
FIG. 4 of the drawing illustrates schematically a continuous injection of the Merox sulfur solvent into a dry sour gas with subsequent separation and recycle of the Merox.

Since the compositions of the present invention achieve the desired liquid phase at very favorable low injection rates, they can be employed in a manner analogous to previous practices associated with removing unwanted deposits in oil and gas wells including soaking, flushing, continuous injection and the like. To illustrate one particularly useful embodiment, FIG. 4 is presented to schematically show a continuous injection of alkyl polysulfide oil into a sour gas well 10 along with the associated separating and reinjection equipment. In this simplified view, the alkyl polysulfide oil after initial preparation is stored in holding tank 12. Depending on the degree of sulfur precipitation and removal and the bottomhole conditions of the sour gas well 10, a continuous stream of alkyl polysulfide oil is withdrawn from holding tank 12, via line 20, and is injected into the bottom of well 10, via spaghetti string 21 and injection pump 11. The resulting liquid phase along with the sour gas production rises to the surface through the larger production string 22 and is transferred to a three-phase separator 13 via line 23. This down stream phase separator is maintained such that gas can be removed overhead, a liquid water phase (if present) can be removed as an intermediate layer, and the alkyl polysulfide oil with sulfur will exit from the bottom via line 24. Preferably, the separator should be maintained at a temperature sufficient to prevent sulfur precipitation from the alkyl polysulfide oil phase. As illustrated in FIG. 4, at least two sulfur settlers 14 and 15 are provided to accept the alkyl polysulfide oil phase from the separator 13 and to remove the sulfur. Each sulfur settler is equipped with a heating and cooling means. The sulfur settlers are operated in a cyclic manner such as to control the amount of sulfur remaining in the alkyl polysulfide oil being returned to the holding tank 12, via lines 25 and 26. After cooling, precipitating the sulfur, transferring the reclaimed polysulfide oil to the holding tanks, liquid sulfur is removed from the bottom of the settlers by heating. Additional dialkyl disulfide oil, sulfur and/or alkyl polysulfide oil can be added to the holding tank through line 27 as needed. In this manner, the alkyl polysulfide oil can be continuously recirculated down the well.

Having described the preferred embodiments, the invention is not to be construed as limited to the particular forms disclosed, since these are to be regarded as illustrative rather than restrictive. Thus, the following claims are intended to cover all the processes which do not depart from the spirit and scope of using the alkyl polysulfide oil as a sulfur solvent in high temperature, high pressure wells.

We claim:

1. A method of dissolving a deposit of elemental sulfur in a high temperature, high pressure sour gas well, characterized in that an aliphatic amine activated dialkyl disulfide sulfur solvent will not exist in a liquid phase at bottomhole conditions of said well for a sufficient time to effect the removal of said sulfur deposits, comprising the steps of:

(a) preparing a relatively nonvolatile, high molecular weight, amine activated dialkyl polysulfide sulfur solvent capable of existing in a liquid phase at said bottomhole conditions consisting of a dialkyl disulfide to which has been added up to about 27 parts by weight of an alkyl amine per 100 parts by weight dialkyl disulfide and at least about 60 parts by weight of elemental sulfur per 100 parts by weight dialkyl disulfide, and (b) injecting said relatively nonvolatile, high molecular weight amine activated dialkyl disulfide sulfur solvent prepared in step (a) into said sour gas well to dissolve and thus remove said sulfur deposit.

2. A method for dissolving a deposit of elemental sulfur according to claim 1 wherein said injection of said relatively nonvolatile, high molecular weight, amine activated dialkyl polysulfide sulfur solvent is continued such as to maintain a liquid phase at bottomhole conditions, thus suppressing any further sulfur deposit formation.

3. A method for dissolving a deposit of elemental sulfur according to claim 1 or claim 2 wherein said dialkyl disulfide is a mixture of dialkyl disulfide having alkyl groups containing from about 2 to about 11 carbon atoms and said sulfur solvent contains at least 80 parts by weight sulfur per 100 parts by weight dialkyl disulfide prior to injection.

* * * * *